Sept. 6, 1960  H. G. McCARTY  2,951,328
SPIDER LOAD DISTRIBUTOR
Filed Oct. 1, 1958

INVENTOR.
HORACE G. McCARTY
BY
ATTORNEY

United States Patent Office
2,951,328
Patented Sept. 6, 1960

2,951,328
SPIDER LOAD DISTRIBUTOR

Horace G. McCarty, New Holland, Pa., assignor to Sperry Rand Corporation, New Holland, Pa., a corporation of Delaware Filed Oct. 1, 1958, Ser. No. 764,717
8 Claims. (Cl. 56—377)

This invention relates to improvements in the construction of spider members employed, for example, in agricultural machinery and, more particularly, in side delivery rakes, but the invention is not restricted to use in spiders for this specific purpose. Particularly in spiders employed in agricultural implements, the outer ends of the arms thereof usually support elements of the implement which frequently are movably connected to the outer ends of the arms of the spider, whereby it is necessary to provide a firm and secure attachment of the pivotal connecting means that are attached to the outer ends of the arms of the spider.

It is common practice at present, to employ wherever possible in implements and machinery of this nature the least expensive means of manufacturing the same in order to combat the constantly rising cost of producing the implements. One means for decreasing the cost is to use members, such as spiders, which are pressed from suitable gauge of sheet metal and shaping the member so as to impart the needed rigidity and strength thereto such as by employing reinforcing flanges, ribs, and the like. However, the use of sheet metal for such purposes introduces problems, one of these being the distribution of load to a wider area of the sheet metal member than is afforded by the area of the sheet metal immediately surrounding a hole through which a bolt or threaded pin passes for securing another member to the sheet metal member. When an element of an implement or machine is cast from metal, for example, it is possible to strengthen and reinforce certain areas thereof by providing bosses, reinforcing ribs, thickened areas, and the like which lend themselves readily to being formed by casting, simply by shaping the mold accordingly. However, this is not possible when forming similar elements from sheet metal.

Heretofore, the problem of distributing the load in the ends of the arms of a spider for an agricultural implement of the type referred to above, for example, has resulted in the use of additional members of substantial size, somewhat resembling auxiliary arms, which are welded or otherwise affixed to the sheet metal member in order to distribute the load when another element or member is attached thereto. The provision of such an additional reinforcing member, and particularly the affixing thereof by welding or the like, adds to the cost of producing the same and thus is not altogether satisfactory.

It is the principal object of the present invention to provide a spider for an agricultural implement, for example, with separate inexpensive and simple metal members which are complementary to certain spaced portions of the outer ends of the arms of a spider and said members are forced into engagement with said spaced portions incident to the connection of another element of the implement to the outer end of the arm of the spider, whereby the load placed upon the arm of the spider by the connection of said other element thereto is distributed to a number of spaced portions on the outer ends of the arms.

Another object of the invention is to utilize the shape of reinforcing flanges on the outer edges of the arms of a spider of the type referred to and render the metallic load distributing members complementary to at least certain portions of said flanges, whereby the inherent resilience of the metallic member and the arms of the spider are employed to aid in conforming spaced portions of the metallic member with adjacent spaced portions of the arm of the spider, such arrangement also facilitating the equalizing of the load upon the various spaced portions of the metallic member and flanges of the arms of the spider.

A further object of the invention is to form the metallic load distributing member with spaced portions offset from the central portion thereof and which arrangement is inexpensive to form in the load distributing member and also provides reinforcing means for the member which tends to resist deformation thereof during the operation of securing another element of an implement to the outer end of the arms of the spider but the inherent resilience of the member also permits equalizing of the pressure exerted by the spaced portions.

Details of the foregoing objects and of the invention, as well as other objects thereof, are set forth in the following specification and illustrated on the accompanying drawing comprising a part thereof.

Figure 1:
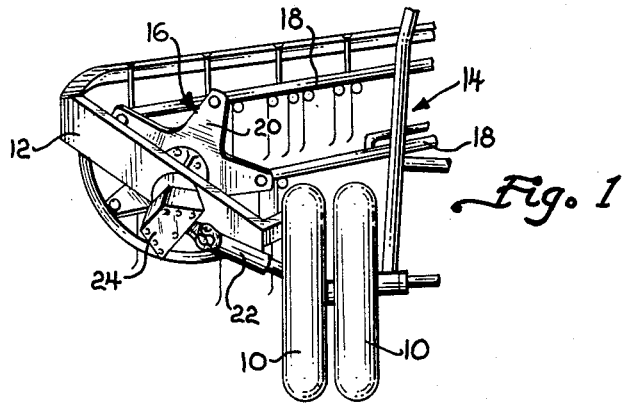
Fig. 1 is a rear elevation of a fragmentary end portion of an agricultural implement utilizing a spider and being exemplary of the type of mechanism with which the present invention is employed advantageously.

In Fig. 1, one end of an agricultural implement comprising a side delivery rake has been selected as an exemplary mechanism to illustrate the present invention and comprises a representative type of implement or mechanism in which said invention may be employed to advantage. In order that the illustration of the invention might be simplified, only one fragmentary end portion of the side delivery rake is shown. In this figure, a pair of wheels 10 are shown in end elevation, the wheels supporting the frame 12 of the implement 14. In this implement, a spider 16 is supported for rotation relative to the frame 12. It will be understood that a similar spider is rotatably supported by the opposite side of the frame 12 and tine bar members 18 extend between said spiders. The opposite ends of the tine bars are rotatably connected respectively to the outer ends of the arms 20 of the spider. At least one spider is driven by any suitable means such as a drive shaft 22 which extends between gear box 24 and the outer wheel 10, suitable universal joints being used where necessary.

Figures 2, 3:
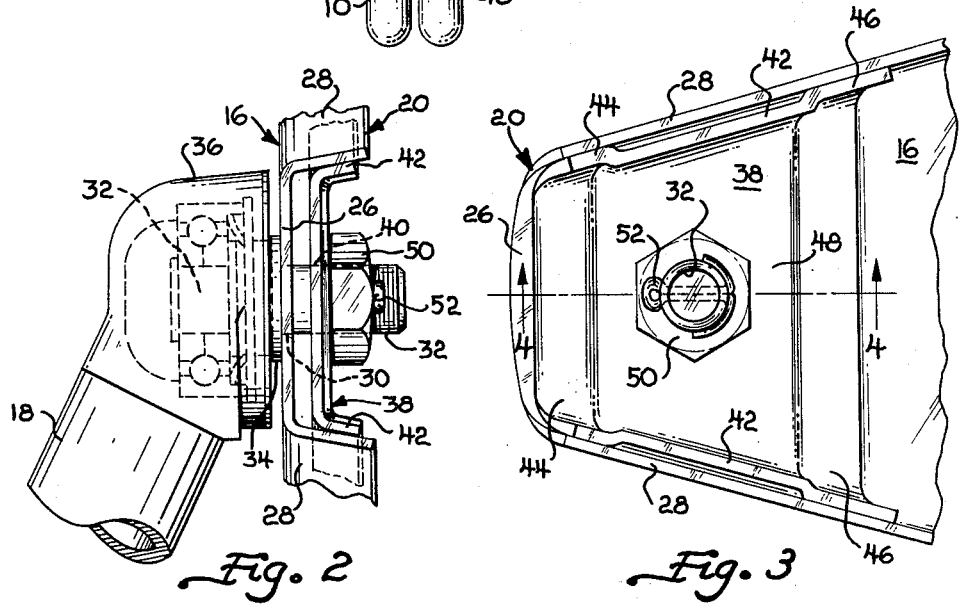
Fig. 2 is an end view of the fragmentary outer enlarged end portion of one arm of the spiders shown in Fig. 1 and to which a fragmentary end portion of another element of the implement of Fig. 1 is connected.
Fig. 3 is a fragmentary side elevation of the outer end of the arm of the spider shown in Fig. 2, as viewed from the right-hand end of Fig. 2, this figure showing advantageously the interengagement of the load distributing member comprising the present invention with the outer end of an arm of the spider.
Figure 4:
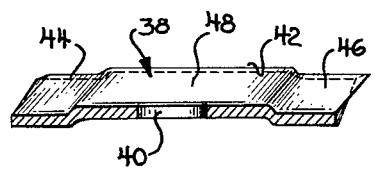
Fig. 4 is a transverse sectional view of the load distributing member per se illustrated in Figs. 2 and 3 as seen on the line 4—4 of Fig. 3.

Referring to Fig. 2 which illustrates, on a larger scale than in Fig. 1, specific details of means connecting the outer ends of the tine bars 18 to the outer ends of arms 20 of the spider 16 in accordance with the invention, it will be seen that the arms 20 preferably have a substantially flat intermediate portion 26 and opposed flanges 28 are integral with opposite edges of the intermediate portion 26 and extend from the same surface thereof preferably in slightly diverging relationship to each other as is best shown in Fig. 2. Each of the arms 20 is provided adjacent the outer end thereof with an aperture 30 spaced from flanges 28 and having a suitable diameter to freely receive the connecting pin 32, said pin having a flange 34 thereon which abuts the outer surface of intermediate portion 26 of arm 20.

The outer end of each tine bar 18 has a housing 36 thereon which encloses anti-friction bearing means that enables the housing and tine bar 18 to rotate about the axis of connecting pin 32 when the implement is operating. The elements of the mechanism within housing 36 do not comprise part of the present invention however and therefore are not illustrated in detail.

The purpose of the present invention is to facilitate the connection of one of each of the elements, specifically and exemplarily illustrated herein as tine bars 18, to the outer end portion of each of the spider arms 20 and, rather than concentrate the load of such element 18 upon the portion of the arm 20 which immediately surrounds the connecting pin 32, the present invention comprises load distributing means which will spread or distribute such load over a much wider area of the outer end portions of the spider arms 20, thereby permitting the spider 16 to be formed from sheet metal of a lighter gauge than would be possible if the arms per se were required to assume the full load for example. Such load distributing means now will be described in detail.

Referring to Figs. 2 and 3, it will be seen that between the flanges 28 of the outer end of the exemplary spider arm 20, a preferably metallic load distributing member 38 is positioned. This member preferably is formed by stamping the same from sheet metal of suitable gauge. The member 38, substantially centrally thereof, is provided with an aperture 40 which receives connecting pin 32. The opposite ends of member 38 are bent at an angle to the intermediate portion thereof to comprise flanges 42 which preferably are complementary to the flanges 28 of the spider arms 20. Such complementary shaping of the flanges 42 to the flanges 28 results in the flanges 42 of member 38 also being slightly flared outwardly relative to each other and the length of the flanges 42 preferably is substantially less than that of flanges 28 of spider arms 20, as is clear from Fig. 2, whereby in use, the adjacent surfaces of arm 20 and member 38 are spaced from each other.

Engagement between load distributing member 38 and the inner surfaces of the spider arms 20, and more specifically the flanges 28 thereof, takes place between portions thereof which are substantially spaced from the apertures 30 and 40 respectively in the arms and load distributing members 38. To accomplish this, the opposite side portions 44 and 46 of member 38 are parallel to but offset from the intermediate portion 48 of said member as is best illustrated in Fig. 3. Hence, as is readily seen from Figs. 2 and 3, the opposite end portions of flanges 42 of load distributing member 38 engage adjacent surface portions of flanges 28 of spider arm 20, while the intermediate portions of the members 38 are spaced substantially from the intermediate portion 26 of the spider arms 20 as is clearly seen in Fig. 2.

When securing or locking means such as a nut 50 is threaded upon connecting pin 32 and tightly abuts the outer surface of intermediate portion 48 of the load distributing member 38, the natural resilience of the sheet material from which the spider arms 20 and member 38 are formed will permit a limited amount of flexing thereof toward each other, depending upon how tightly the nut 50 is threaded upon connecting pin 32. Such resilience of the material will tend to provide a continuously firm connection of the pin 32 with the spider arms 20. Further, however, such firm tightening of the nut 50 will cause the resilience of load distributing member 38 to result in equalizing of the engagement of the outer ends of offset side portions 44 and 46 of the flanges of the distributing member 38 with the spaced portions of the inner surfaces of flanges 28 of the spider arms 20. More importantly, this also results in a relatively wide distribution of the load of the elements such as tine bars 18 upon the spider arms.

The installation of the load distributing members 38 is accomplished quickly and easily with no more effort than would be required to place a washer over the connecting pins 32 and tightening the nuts 50 thereagainst. After the nut has been tightened a desired amount against the load distributing member 38, a cotter pin 52 may be inserted through a hole in the connecting pin 32 to prevent accidental removal of the nut 50 from said pin 32. Also, the interfitting or nesting of member 38 between the flanges of arm 20 prevents relative rotation therebetween when tightening nut 50.

From the foregoing, it will be seen that the present invention provides a simple, easily installed, and inexpensive load distributing means for attaching elements to the outer ends of the arms of a spider in an agricultural implement for example, which spider may be formed from pressed sheet metal and the engagement of the load distributing members with spaced portions of the outer ends of the spider arms transfers to said spaced portions what otherwise would be a load concentrated on the spider arm immediately around a connecting bolt member extending through a hole therein. The shape of the load distributing member is complementary to the outer portion of the spider arm which is engaged thereby and the provision of offset opposite side portions in the load distributing member not only strengthens and provides rigidity to said member but the clearance between the intermediate portion of the member and the spider arm permits flexibility in the engagement of the offset portions of the distributing member with the arms, together with equalizing of the pressures exerted by said offset portions with said arms.

While the invention has been described and illustrated in its preferred embodiment, and has included certain details, it shouldl be understood that the invention is not to be limited to the precise details herein illustrated and described since the same may be carried out in other ways falling within the scope of the invention as claimed.

I claim:

1. An implement spider having arms extending outwardly from the center thereof and an aperture extending through the outer end portion of each arm, an implement member arranged for attachment to each arm adjacent the outer end thereof, and connecting means on said member extending through said aperture in the arm supporting the same, in combination with load distributing means having portions engaging abuttingly against surface portions of each arm spaced from said aperture therein, said load distributing means having an opening receiving said connecting means, and securing means detachably connected to said connecting means and engaging said load distributing means, said securing means securing said member to said arm to hold said portions of said load distributing means firmly against said portions of said arm, thereby distributing the load of said member upon said arm to said portions thereof spaced from said aperture therein.

2. An implement spider having arms extending outwardly from the center thereof and an aperture extending through the outer end portion of each arm, an implement member arranged for attachment to each arm adjacent the outer end thereof, and connecting means on said member extending through said aperture in the arm supporting the same, in combination with load distributing means comprising a plate-like element having an aperture substantially centrally thereof and portions spaced from said aperture and engaging abuttingly against surface portions of each arm, the opening of said load distributing element receiving said connecting means, and securing means detachably connected to said connecting means and engaging said load distributing element, said securing means securing said member to said arm to hold said portions of said load distributing element firmly against said portions of said arm, thereby distributing the load of said member upon said arm to said portions thereof spaced from said aperture therein.

3. An implement spider having arms extending outwardly from the center thereof and an aperture extending through the outer end portion of each arm, an implement member arranged for attachment to each arm adjacent the outer end thereof, and connecting means on said member extending through said aperture in the arm supporting the same, in combination with load distributing means comprising a plate-like element having an aperture substantially centrally thereof and edge portions spaced from said aperture and engaging abuttingly against surface portions of each arm, said edge portions on said element being offset from the central portion of said element toward said arm and the opening of said element receiving said connecting means, and securing means detachably connected to said connecting means and engaging with said load distributing element, said securing means securing said member to said arm to hold said offset portions of said load distributing element firmly against said portions of said arm, thereby distributing the load of said member upon said arm to said portions thereof spaced from said aperture therein.

4. An implement spider having arms extending outwardly from the center thereof and an aperture extending through the outer end portion of each arm, an implement member arranged for attachment to each arm adjacent the outer end thereof, and connecting means on said member extending through said aperture in the arm supporting the same, in combination with load distributing means comprising a resilient plate-like sheet metal element having an opening therethrough intermediately of the sides thereof and said sides engaging abuttingly against surface portions of each arm, the opening of said load distributing element receiving said connecting means, and securing means threadably connected to said connecting means and engaging said load distributing element, said securing means detachably securing said member to said arm to hold said sides of said load distributing element firmly against said arm, the resilience of said element rendering the same conformable to said surface portions of said arms with substantially equalized pressure, thereby distributing the load of said member upon said arm to said portions thereof spaced from said aperture therein.

5. A pressed sheet-metal implement spider having arms extending outwardly from the center thereof, flanges extending at an angle from the opposite edges of said arms and the outer ends of said arms each having an aperture extending therethrough, implement members respectively connected at one end to said arms, pins connected to said members and extending respectively through the apertures in said arms, and nuts threaded onto the outer ends of said pins, in combination with a load distributing element for each arm and respectively having means receiving said pins, each of said elements having portions respectively engaging portions of said flanges spaced from the aperture in said arm and the nut on each pin interengaging the outer surface of said element to secure the pin to the arm and force said portions of said elements into firm engagement with said spaced portions on said arms to distribute the load of said elements thereto.

6. A pressed sheet-metal implement spider having apertured arms extending outwardly from the center thereof, the opposite edges of said arms having flanges extending from one surface thereof and diverging outwardly from each other and the aperture in each arm being spaced from the flanges thereof, implement members respectively connected at one end to said arms, pins connected to said members and extending respectively through the apertures in said arms, and nuts threaded onto the outer ends of said pins, in combination with a load distributing element for each arm and respectively having an opening receiving said pins and positioned between the flanges of said arms, each of said elements having portions respectively engaging portions of the inner surfaces of said flanges spaced from the aperture in said arm and the nut on each pin interengaging the outer surface of said element to secure the pin to the arm and force said portions of said elements into firm engagement with said spaced portions of said flanges of said arms to distribute the load of said elements thereto.

7. A pressed sheet-metal implement spider having arms extending outwardly from the center thereof, the opposite edges of said arms having flanges extending from one surface thereof and diverging outwardly from each other and each arm having an aperture spaced from said flanges, implement members respectively connected at one end to said arms, pins connected to said members and extending respectively through the apertures in said arms, and nuts threaded onto the outer ends of said pins, in combination with a load distributing element for each arm and respectively having an opening receiving said pins, said elements having flanges at opposite edges complementary to and positioned between the flanges of said arms, each of said elements having portions on the flanges thereof respectively engaging portions of the inner surfaces of said flanges of said arms spaced from the aperture in said arm and the nut on each pin interengaging the outer surface of said element to secure the pin to the arm and force said portions of said elements into firm engagement with said spaced portions of said flanges of said arms to distribute the load of said elements thereto.

8. A sheet-metal implement spider having arms extending outwardly from the center thereof and said arms having flanges on the opposite edges which extend from one surface thereof and diverge outwardly from each other, the outer ends of said arms each having an aperture spaced from said flanges, implement members respectively connectable at one end to said arms, pins connected to said members and extending respectively through the apertures in said arms, and nuts threaded onto the outer ends of said pins, in combination with a load distributing element for each arm having flanges at opposite edges complementarily to the flanges of said arms, said elements respectively having openings receiving said pins and positioned between the flanges of said arms, the flanges of each of said elements having edge portions offset from the central portions thereof toward and respectively engaging portions of said flanges spaced from the aperture in said arm and the nut on each pin interengaging the outer surface of said element to secure the pin to the arm and force said offset portions of said flanges of said elements into firm engagement with said spaced portions of said flanges of said arms to distribute the load of said elements thereto.

References Cited in the file of this patent

UNITED STATES PATENTS

| | | |
|---|---|---|
| 2,658,324 | Johnson | Nov. 10, 1953 |
| 2,761,271 | Spicacci | Sept. 4, 1956 |
| 2,762,189 | Vutz | Sept. 11, 1956 |